(12) United States Patent
Masarwa

(10) Patent No.: US 7,886,775 B2
(45) Date of Patent: Feb. 15, 2011

(54) IRRIGATION PIPE

(75) Inventor: Abed Masarwa, Taibe (IL)

(73) Assignee: Netafim, Ltd., Tel Aviv (IL)

( * ) Notice: Subject to any disclaimer, the term of this patent is extended or adjusted under 35 U.S.C. 154(b) by 980 days.

(21) Appl. No.: 11/783,608

(22) Filed: Apr. 10, 2007

(65) Prior Publication Data
US 2008/0251152 A1 Oct. 16, 2008

(51) Int. Cl.
*F16L 11/00* (2006.01)
(52) U.S. Cl. ............... 138/123; 138/124; 138/140; 138/137
(58) Field of Classification Search ......... 138/123–125; 239/542
See application file for complete search history.

(56) References Cited

U.S. PATENT DOCUMENTS

| | | | | |
|---|---|---|---|---|
| 3,850,203 | A | 11/1974 | Shobert | 138/125 |
| 3,858,618 | A | 1/1975 | Kaufman | 138/149 |
| 4,190,206 | A * | 2/1980 | Atkinson et al. | 239/271 |
| 4,228,824 | A * | 10/1980 | Evans et al. | 138/119 |
| 4,308,896 | A | 1/1982 | Davis | 138/126 |
| 4,718,608 | A * | 1/1988 | Mehoudar | 239/542 |
| 6,045,884 | A * | 4/2000 | Hess et al. | 428/36.1 |
| 6,217,975 | B1 | 4/2001 | Daton-Lovett | |
| 6,588,456 | B2 * | 7/2003 | Jeong | 138/125 |
| 2003/0201345 | A1 * | 10/2003 | Jeong | 239/542 |
| 2005/0109414 | A1 * | 5/2005 | Jeong | 138/123 |
| 2005/0194469 | A1 | 9/2005 | Masarwa et al. | 239/542 |
| 2006/0103131 | A1 | 5/2006 | Masarwa et al. | 285/125.1 |
| 2006/0281379 | A1 | 12/2006 | Haas et al. | 442/36 |
| 2007/0074776 | A1 * | 4/2007 | Masarwa et al. | 138/124 |
| 2007/0277893 | A1 | 12/2007 | Bedford | 138/92 |

FOREIGN PATENT DOCUMENTS

| | | |
|---|---|---|
| DE | 26 26 217 | 12/1977 |
| GB | 1 326 037 | 8/1973 |
| KR | 10-0317060 | 1/2002 |
| KR | 20-2002-0009419 | 3/2002 |

OTHER PUBLICATIONS

K. Berns et al., "Six-legged Robot Actuated by Fluidic Muscles." Computer Science Research Center, Karlsruhe, Germany.
International Search Report No. PCT/IL2008/000271, dated Sep. 17, 2008.

* cited by examiner

*Primary Examiner*—Patrick F Brinson
(74) *Attorney, Agent, or Firm*—Womble Carlyle

(57) ABSTRACT

An irrigation pipe formed from a sheet that is rolled into a tube about a longitudinal axis of the sheet. The pipe has a watertight layer and a fabric layer. The fabric layer comprises a first fiber arrangement including first main fibers having a first orientation and a second fiber arrangement including second main fibers having a second orientation. The first and second orientations are transverse relative to each other and to the longitudinal axis when viewed in the sheet before it is rolled.

24 Claims, 5 Drawing Sheets

IRRIGATION PIPE

FIELD OF THE INVENTION

This invention relates to an irrigation pipe, and more specifically to multilayer irrigation pipes comprising at least a water-tight layer and a fabric layer.

BACKGROUND OF THE INVENTION

Multilayer pipes having fabric layers are known to be used in irrigation systems. Such layers are known to be formed, for example, by braiding fibers in a tubular form or by weaving fibers to form a substantially flat sheet having two opposite longitudinal ends and bending the sheet into a tubular form and bonding the opposite longitudinal ends to each other. In the latter case the fabric layer comprises weft and warp fibers, respectively aligned along the unbent sheet's longitudinal axis and a transverse axis substantially perpendicular thereto.

SUMMARY OF THE INVENTION

During experimentation, inventors of the present invention have found that orientation of the main or structural fibers in a fabric layer of irrigation pipes influence the extent of it's elongation along a longitudinal axis thereof due to pressure caused by fluid passing therethrough. Even a small percentage of elongation for a long irrigation pipe may result in a significant elongation length causing detrimental effects to an irrigation system to which such elongated pipe belongs. This is particularly relevant for pipes which are part of a field irrigation system, where it is desired that a pipe remain in a predisposed location in order to provide fluid to designated crops. Additionally, pipe elongation may cause undue pressure on the connection points between the elongated pipe and pipes it is connected to, potentially weakening or causing disengagement thereof. Moreover, elongation of the pipe may result in a snaking or zigzag shape of the pipe at a portion thereof, caused by the frictional interaction of the elongated portion of the pipe with the surface upon which it rests, thereby adversely affecting fluid flow therein.

For the purposes of the specification and the claims, main or structural fibers are defined as the primary load bearing fibers of a fabric layer to which they belong, and therefore constitute the main structural elements thereof. Auxiliary fibers of a fabric layer are defined as fibers primarily designed to hold main fibers with which they are associated in their orientation.

Thus, in accordance with one aspect of the present invention there is provided an irrigation pipe formed from a sheet that is rolled into a tube about a longitudinal axis of the sheet, the sheet comprising a watertight layer and a fabric layer, the fabric layer comprising a first fiber arrangement including first main fibers having a first orientation and a second fiber arrangement including second main fibers having a second orientation, wherein the first and second orientations are transverse relative to each other and to the longitudinal, axis when viewed in the sheet before it is rolled.

In accordance with another aspect of the present invention there is provided an irrigation pipe formed from a sheet that is rolled into a tube about a longitudinal axis of the sheet, the sheet comprising a watertight layer and a fabric layer, the fabric layer comprising a first fabric sub-layer and a second fabric sub-layer bonded to each other, the first fabric sub-layer having a first fiber arrangement including first main fibers having a first orientation, the second fabric sub-layer having a second fiber arrangement including second main fibers having a second orientation, the first and second orientations being transverse relative to each other and to the longitudinal axis when viewed in the sheet before it is rolled.

In accordance with yet another aspect of the present invention there is provided an irrigation pipe comprising a water tight inner layer, an outer layer and a fabric layer therebetween, the outer layer being formed with gaps that permit passage of fluid therethrough from the fabric layer.

A pipe according to any one of the above aspects of the invention may comprise a plurality of apertures formed therein at locations spaced apart along the longitudinal axis of the pipe.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
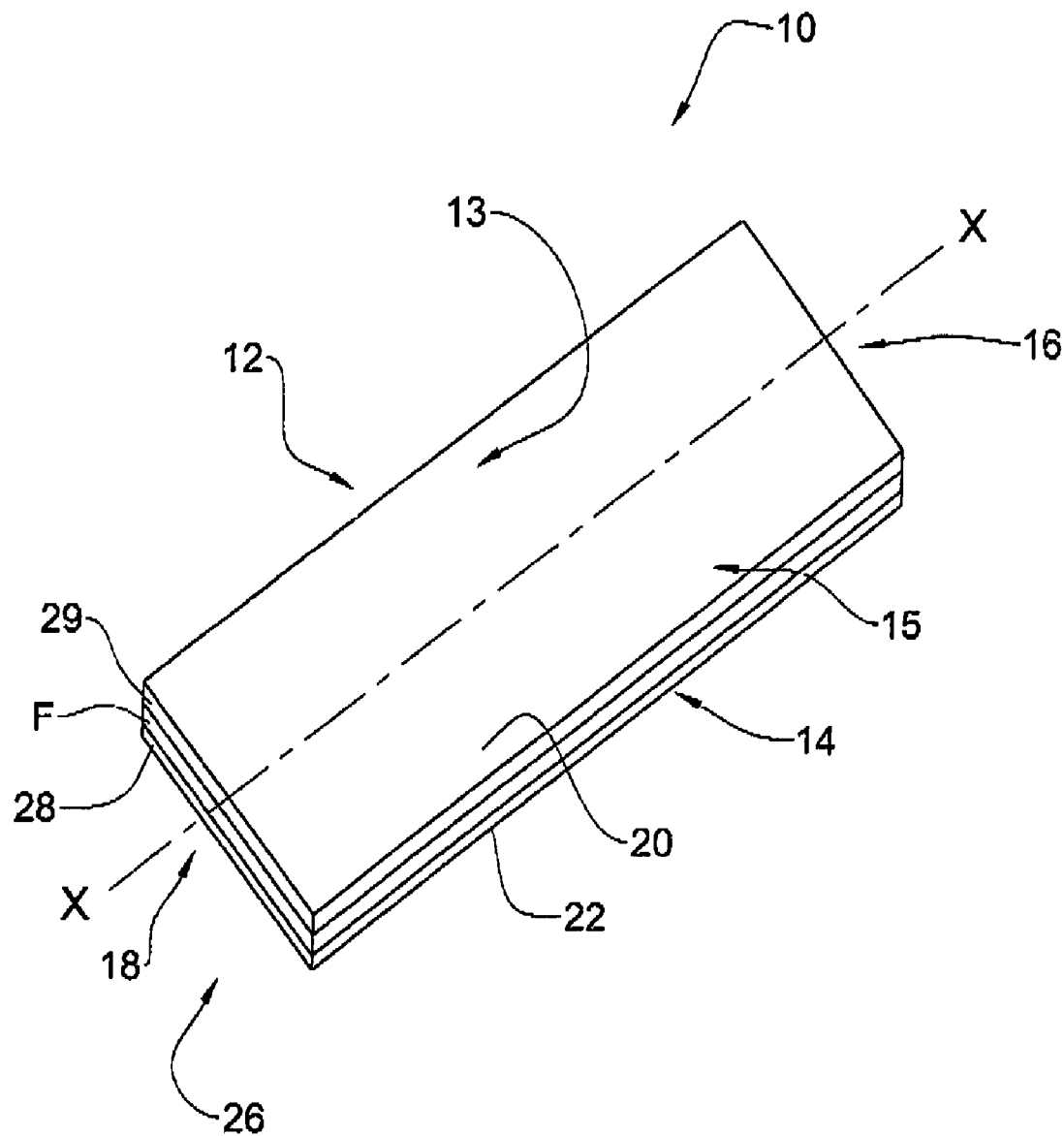
FIG. 1 is a perspective top view of a multilayer sheet.

Referring now to the drawings wherein like reference characters designate like or corresponding parts throughout several views, there is shown in FIG. 1, a multilayer sheet generally designated as 10.

The sheet 10 is of a generally rectangular shape in a top view and comprises a first longitudinal edge 12, a second longitudinal edge 14, a first lateral edge 16, a second lateral edge 18, a top surface 20 extending between the edges (12, 14, 16, 18), an opposing bottom surface 22 extending between the edges (12, 14, 16, 18) and a central longitudinal axis X. The sheet 10 further comprises a layer composition generally designated as 26, having a bottom layer 28, a top layer 29 and a fabric layer designated as F sandwiched therebetween. The bottom layer 28 includes the bottom surface 22 at a bottom end thereof, the top layer includes the top surface 20 at a top end thereof and the longitudinal edges (12, 14, 16, 18) extend along the layers (28, 29, F) to bound the layer composition at its circumference. A first longitudinal end 13 of the sheet 10 is defined adjacent the first longitudinal edge 12 and a second longitudinal end 15 of the sheet 10 is defined adjacent the second longitudinal edge 14.

Figure 2A:
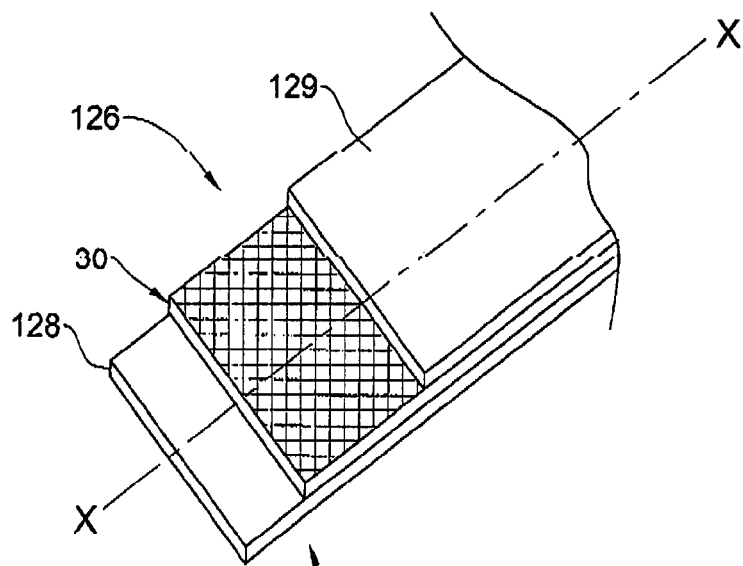
FIG. 2A is a schematic exploded view of a layer composition, that may be used in the sheet in FIG. 1, in accordance with one embodiment of the present invention.
Figure 2B:
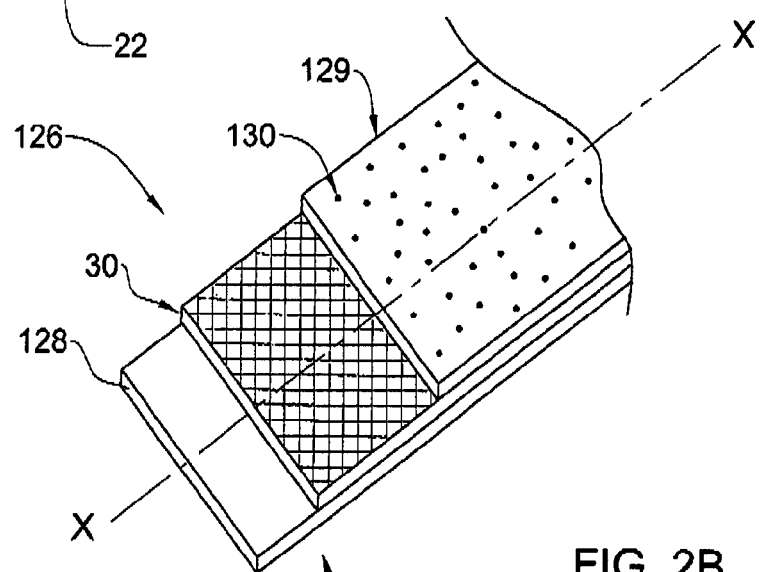
FIG. 2B is a schematic exploded view of a layer composition that may be used in the sheet in FIG. 1, in accordance with another embodiment of the present invention.
Figure 3:
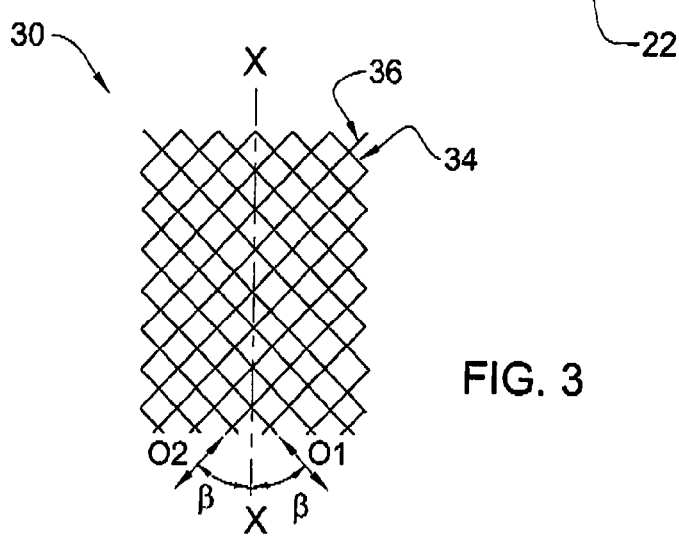
FIG. 3 is an enlarged schematic top view of a fabric layer of the layer composition shown in FIGS. 2A and 2B.

In FIGS. 2A, 2B and 3, a first example of a layer composition, generally designated as 126, that may constitute the layer composition 26 of the multilayer sheet 10, is shown. The layer composition 126 has a layer 128 constituting the bottom layer 28 of the sheet 10 or a sub-layer thereof, a layer 129 constituting the top layer 29 of the sheet 10 or a sub-layer thereof, and a fabric layer 30 constituting the fabric layer F of the sheet 10 or a sub-layer thereof. The layer 128 is a water-tight polymeric layer film or coating which serves to prevent fluid from passing therethrough (FIGS. 2A, 2B). Layer 128 may be made of materials such as Polyethylene, Polypropylene, COC, TPO, PVC, TPE. Optionally, the polymeric layer 128 is made by Metallocene polymerization.

Layer 129 may be generally similar to layer 128 (FIG. 2A). Or optionally, layer 129 may include materials such as in layer 128 with the addition of gaps 130 (FIG. 2B) formed therein, through which the fabric layer 30 may be in fluid breathable communication with the top surface 20 of the sheet 10.

Referring to FIG. 3, the fabric layer 30 comprises a first fiber arrangement 34 including first main fibers having a first orientation indicated by the arrow designated as O1, and a second fiber arrangement 36 including second main fibers having a second orientation indicated by the arrow designated as O2. The first and second orientations are transversely oriented to each other and to the longitudinal axis X of the sheet 10 when viewed in the sheet before it is rolled into a pipe. The main fibers are made of a polyolefin or a polyolefin composition and the first and second fiber arrangements (34, 36) are optionally inter-woven. Each one of the transversely orientated first and second orientations (O1, O2) forms an acute bias angle β with the longitudinal axis X when measured in the sheet before it is rolled into a pipe. Optionally, the bias angle β is between 20° and 70° and preferably between 45° and 65°. It is noted that polyolefin is a relatively cheap material which may be easily recycled.

In FIGS. 4A, 4B, 5 and 6, a further example of a layer composition, generally designated as 40, that may constitute the layer composition 26 of the multilayer sheet 10, is shown. The layer composition 40 is shown to comprise a layer 228 constituting the bottom layer 28 of the sheet 10 or a sub-layer thereof, layer 229 constituting the top layer 29 of the sheet 10 or a sub-layer thereof, and a fabric layer 42 constituting the fabric layer F of the sheet 10 or a sub-layer thereof.

Figure 4A:
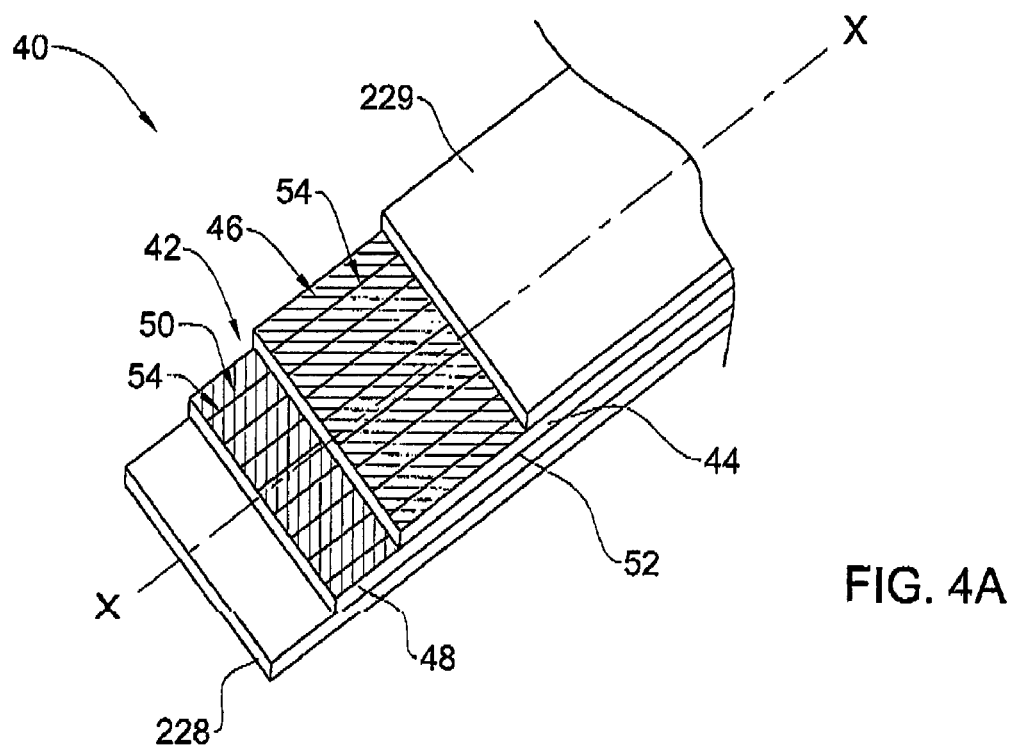
FIG. 4A is a schematic exploded view of a layer composition including layers and sub-layers that may be used in the sheet shown in FIG. 1, in accordance with yet another embodiment of the present invention.
Figure 4B:
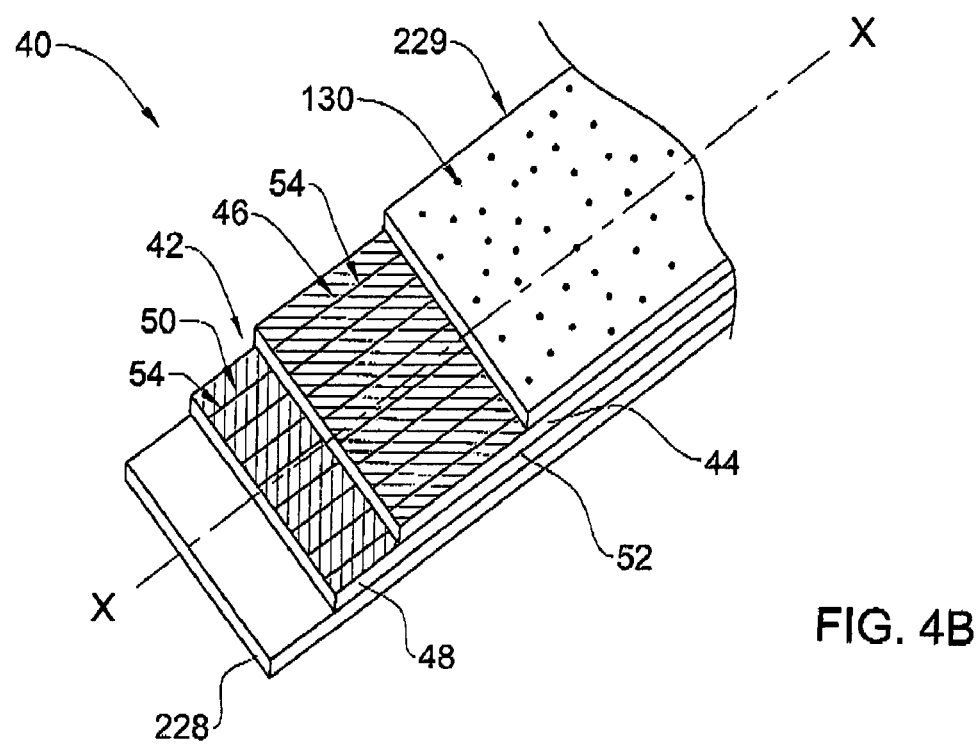
FIG. 4B is a schematic exploded view of a layer composition including layers and sub-layers that may be used in the sheet shown in FIG. 1, in accordance with even yet another embodiment of the present invention.

The layer 228 is a water-tight polymeric layer film or coating which serves to prevent fluid from passing therethrough (FIGS. 4A, 4B). Layer 228 may be made of materials such as Polyethylene, Polypropylene, COC, TPO, PVC, TPE. Optionally, the polymeric layer 228 is made by Metallocene polymerization.

Layer 229 may be generally similar to layer 228 (FIG. 4A). Or optionally, layer 229 may include materials such as in layer 228 with the addition of gaps 130 (FIG. 4B) formed therein, through which the fabric layer 42 may be in fluid breathable communication with the top surface 20 of the sheet 10.

The fabric layer 42 comprises a first fabric sub-layer 44 (FIG. 5) having a first fiber arrangement 46, and a second fabric sub-layer 48 (FIG. 6) having a second fiber arrangement 50. The first fiber arrangement 46 comprises first main fibers in a first orientation, indicated by the arrow designated as O1. The second fiber arrangement 50 comprises second main fibers in a second orientation indicated by the arrow designated as O2. The main fibers are made of a polyolefin or a polyolefin composition and the first and second fabric sub-layers (44, 48) are bonded to each other. Optionally, a layer 52 is located between the first and second fabric sub-layers (44, 48) to form the bonding. Layer 52 may be made of materials such as in layer 228.

Figure 5:
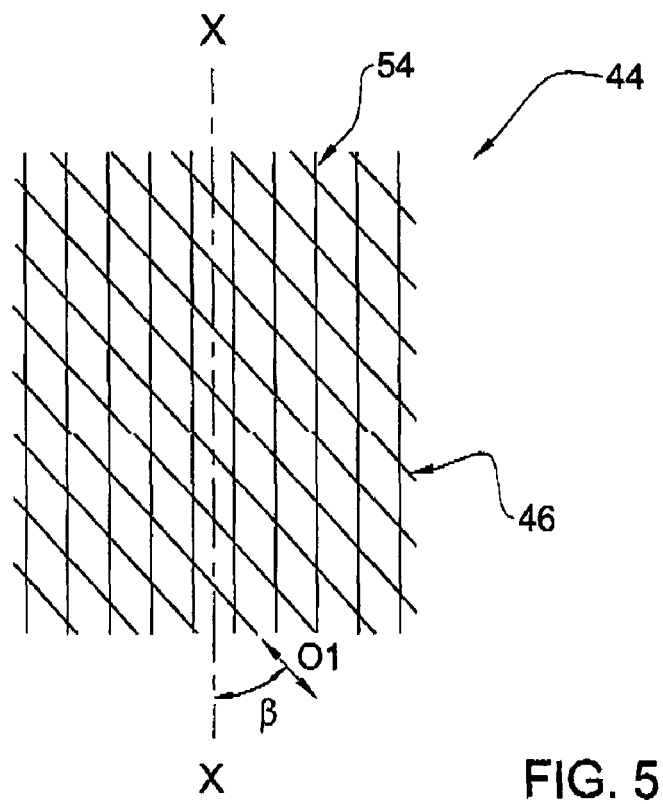
FIG. 5 is an enlarged schematic top view of one of fabric sub-layers of the layer composition shown in FIGS. 4A and 4B.
Figure 6:
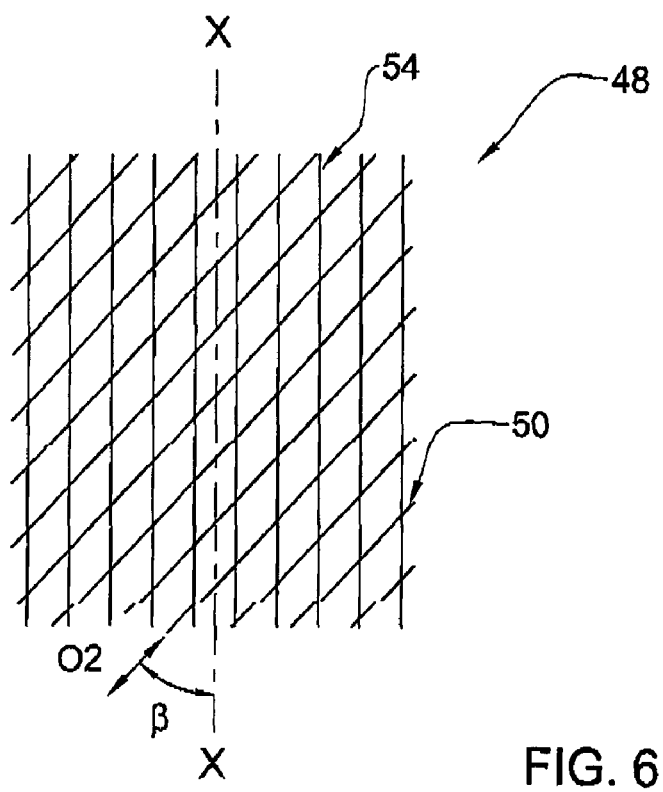
FIG. 6 is an enlarged schematic top view of another one of fabric sub-layers of the layer composition in FIGS. 4A and 4B.

As seen in FIGS. 5 and 6, each one of the transversely orientated first and second orientations (O1, O2) forms an acute bias angle β with the longitudinal axis X when measured in the sheet before it is rolled into a pipe. Optionally, the bias angle β is between 20° and 70° and preferably between 45° and 65°. In addition it is seen that both the first and second fabric sub-layers (44, 48) optionally comprise a plurality of auxiliary longitudinal fibers 54 made of a polyolefin. These fibers 54 function, inter alia, to respectively hold the first and second main fibers in their orientations in the sheet 10 during production of the sheet 10.

Figure 7:
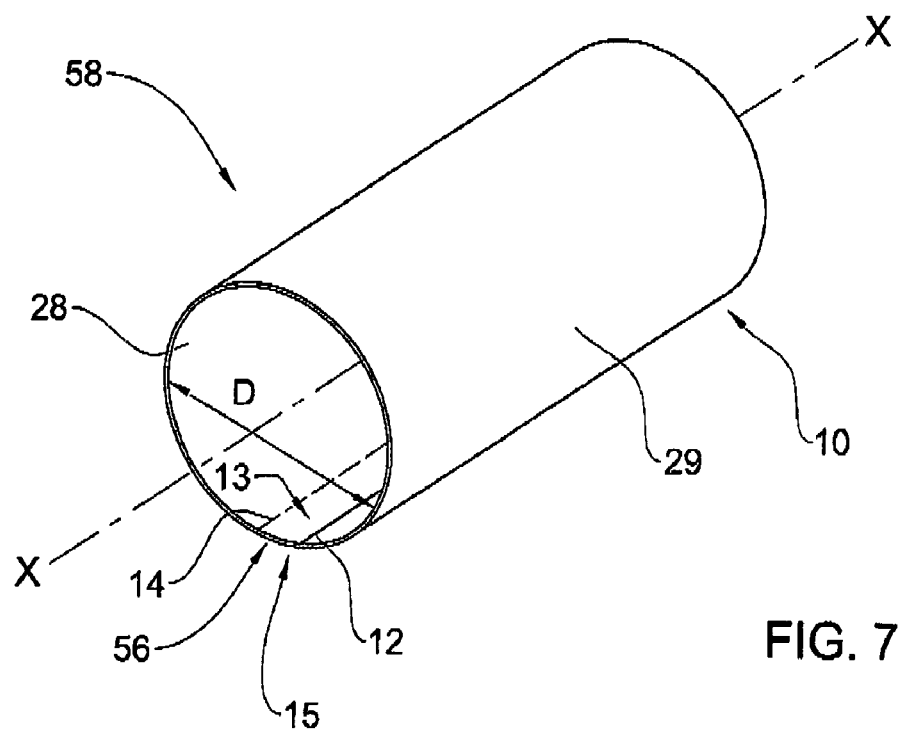
FIG. 7 is a schematic perspective view of the multilayer sheet in FIG. 1, formed to make a pipe.

Attention is drawn to FIG. 7. Regardless of whether the sheet 10 comprises the layer composition 126 or 40, to form a pipe 58 the sheet 10 is bent, rolled or folded about the axis X into a tubular form, having a diameter D such that the bottom layer 28 constitutes an inner layer thereof and the top layer 29 constitutes an outer layer thereof. A water-tight seam 56 of the pipe 58 is formed by overlapping and bonding at least portions of the first and second longitudinal ends 13, 15 of the sheet 10. Optionally, the seam 56 of the pipe 58 is formed by bonding the first longitudinal edge 12 to the second longitudinal edge 14 (not shown).

It is noted that that in the pipe 58, the seam 56 forms a support for each main, fiber at both its ends (12, 14) which increases the load bearing ability of each main fiber. Additionally it is noted that the pipe 58 is of a lay-flat type which when not in use under fluid pressure and/or when rolled on a reel may have a shape of a generally flat strip (not shown).

By way of an example, in an irrigation pipe 58 having either one of the layer compositions 126 or 40, optionally, the material of the inner layer 28 includes Low Density Polyethylene (LDPE), the material of the outer layer 29 includes Low Density Polyethylene (LDPE), High density Polyethylene (HDPE) and COC and the material of the fibers of the fabric layer F includes Linear Low Density Polyethylene (LLDPE) and High density Polyethylene (HDPE). The irrigation pipe 58 may have a diameter of 410 mm≧D≧8 mm and may hold an internal fluid pressure in the pipe of up to 7 bars.

The inventors performed studies of the efficiency of a pipe in accordance with the example noted above at different diameters and at different internal fluid pressures. The studies show that per unit length, a pipe 58 having an angle β of substantially 55° (i.e. 55°±2°) exhibits less axial elongation in relation to a similar pipe with an angle β other than substantially 55°.

Figure 8:
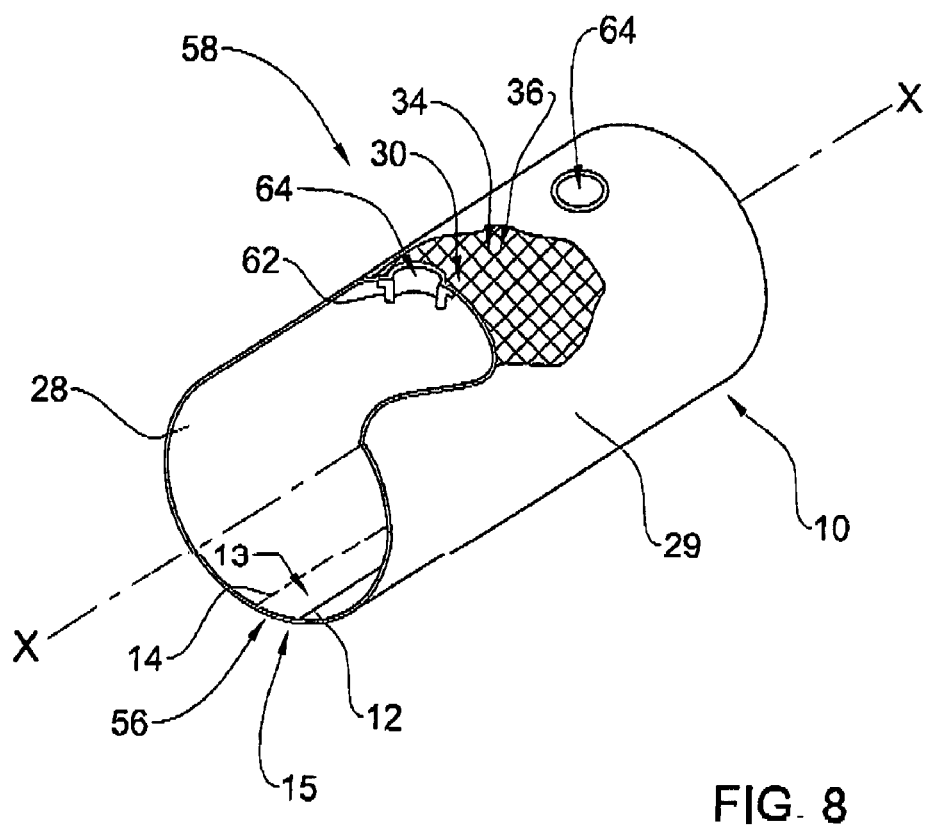
FIG. 8 is a schematic perspective view of the pipe shown in FIG. 7, with apertures formed therein and an irrigation element attached thereto at one of the apertures.

Attention is now drawn to the FIG. 8. In this figure, the pipe 58 comprises the layer composition 126 and a portion of the fabric layer 30 is shown. The pipe 58 may have apertures 64 formed at longitudinally spaced apart locations along the sheet 10, and may have connectors 62 attached to the pipe adjacent these apertures. Each aperture 61 opens out to the top surface 20 and to the bottom surface 22 of the sheet 10.

As seen, each main fiber (34, 36), due to its biased angle β in relation to the axis X, may be cut by the apertures 64 not more than once as opposed to a pipe having main fibers extending, inter alia, axially along the axis X (not shown) wherein the axial main fibers in the vicinity of the apertures may be cut several times. As a result, a pipe 58 with apertures 64 and main fibers at a biased angle β will incur less damage to its load bearing ability than a pipe having main fibers extending, inter alia, along the axis X.

Notably, the pipe 58 may have any number of irrigation elements attached thereto, for example, drip emitters, sprinklers, anti-rip valves, drippers, or pressure regulators may be installed using any known and appropriate method, such as heat-welding, bonding, molding etc. In addition, the apertures 64 may be small apertures which are appropriate for drip irrigation.

While the inner layer 28 of the pipe 58 is a water-tight layer, the introduction of apertures 64 or irrigation elements as described above may cause openings (not shown) through which fluid may enter the fabric layer (30, 42). The irrigation pipe 58 having the breathable outer layer 129 or 229 will allow such fluid to exit the pipe and not accumulate within the fabric layer (30, 42). This reduces damage that may occur to the sheet 10 of pipe 38 if fluid is remained trapped therein.

Those skilled in the art to which the invention pertains will readily appreciate that numerous changes, variations and modifications can be made without departing from the scope of the invention mutatis mutandis.

The invention claimed is:

1. An irrigation pipe formed from a sheet that is rolled into a tube about a longitudinal axis of the sheet, the sheet comprising a watertight layer and a fabric layer, the fabric layer comprising a first fiber arrangement including first main fibers having a first orientation and a second fiber arrangement including second main fibers having a second orientation, wherein the first and second orientations are transverse relative to each other and to the longitudinal axis when viewed in the sheet before it is rolled wherein:
    the fabric layer comprises a first fabric sub-layer and a second fabric sub-layer, the first fabric sub-layer comprises the first fiber arrangement and the second fabric sub-layer comprises the second fiber arrangement; and
    the first fabric sub-layer comprises auxiliary fibers extending along the longitudinal axis and the second fabric sub-layer comprises auxiliary fibers extending along the longitudinal axis.

2. An irrigation pipe according to claim 1, wherein the fibers are made of a polyolefin.

3. An irrigation pipe according to claim 1, wherein the pipe is a lay flat pipe.

4. An irrigation pipe according to claim 1, wherein the first and second fiber arrangements are inter-woven.

5. An irrigation pipe according to claim 1, wherein the first and second orientations each form an acute angle β in relation to the longitudinal axis when measured in the sheet before it is rolled.

6. An irrigation pipe according to claim 5, wherein β has a value less than or equal to 70°.

7. An irrigation pipe according to claim 5, wherein β has a value greater than or equal to 20°.

8. An irrigation pipe according to claim 6, wherein β has a value greater than or equal to 20°.

9. An irrigation pipe according to claim 5, wherein β has a value less than or equal to 65°.

10. An irrigation pipe according to claim 5, wherein β has a value greater than or equal to 45°.

11. An irrigation pipe according to claim 9, wherein β has a value greater than or equal to 45°.

12. An irrigation pipe according to claim 5, wherein β has a value substantially equal to 55°.

13. An irrigation pipe according to claim 1, wherein the sheet is formed with at least one aperture and an irrigation element is attached to the sheet at the at least one aperture.

14. An irrigation pipe formed from a sheet that is rolled into a tube about a longitudinal axis of the sheet, the sheet comprising a watertight layer and a fabric layer, the fabric layer comprising a first fabric sub-layer and a second fabric sub-layer attached to each other, the first fabric sub-layer having a first fiber arrangement comprising first main fibers having a first orientation, the second fabric sub-layer having a second fiber arrangement comprising second main fibers having a second orientation, the first and second orientations being transverse relative to each other and to the longitudinal axis when viewed in the sheet before it is rolled.

15. An irrigation pipe according to claim 14, wherein the sheet is formed with at least one aperture and an irrigation element is attached to the sheet at the at least one aperture.

16. An irrigation pipe comprising a water tight inner layer, an outer layer and a fabric layer therebetween, the outer layer being formed with gaps that permit passage of fluid therethrough from the fabric layer.

17. An irrigation pipe according to claim 16, being formed from a sheet that is rolled into a tube about a longitudinal axis of the sheet, the sheet comprising the inner, outer and fabric layers and at least one aperture that is formed therethrough.

18. An irrigation pipe according to claim 16, wherein the outer layer is in the form of a coating on the fabric layer.

19. An irrigation pipe according to claim 16, wherein the fabric layer is made of a material comprising a polyolefin.

20. An irrigation pipe according to claim 16, wherein:
    the fabric layer comprises a first fabric sub-layer and a second fabric sub-layer attached to each other;
    the first fabric sub-layer has a first fiber arrangement including first main fibers having a first orientation;
    the second fabric sub-layer has a second fiber arrangement including second main fibers having a second orientation;
    the first and second orientations are transverse relative to each other and to said longitudinal axis.

21. An irrigation pipe according to claim 20, further comprising:
    a layer located between the first fabric sub-layer and the second fabric sub-layer and bonding the first fabric sub-layer to the second fabric sub-layer.

22. An irrigation pipe according to claim 20, wherein:
    the first fabric sub-layer comprises auxiliary fibers extending along the longitudinal axis; and
    the second fabric sub-layer comprises auxiliary fibers extending along the longitudinal axis.

23. An irrigation pipe according to claim 14, further comprising:
    a layer located between the first fabric sub-layer and the second fabric sub-layer and bonding the first fabric sub-layer to the second fabric sub-layer.

24. An irrigation pipe according to claim 14, wherein:
    the first fabric sub-layer comprises auxiliary fibers extending along the longitudinal axis; and
    the second fabric sub-layer comprises auxiliary fibers extending along the longitudinal axis.

\* \* \* \* \*